(12) United States Patent
Peck et al.

(10) Patent No.: US 8,051,614 B1
(45) Date of Patent: Nov. 8, 2011

(54) INTUMESCENT STRUCTURE FOR DUCTING CARRYING COMMUNICATIONS CABLING

(75) Inventors: Steve D. Peck, Overland Park, KS (US); Mark Stephen Edwards, Vancouver, WA (US)

(73) Assignee: Sprint Communications Company L.P., Overland Park, KS (US)

( * ) Notice: Subject to any disclaimer, the term of this patent is extended or adjusted under 35 U.S.C. 154(b) by 1603 days.

(21) Appl. No.: 11/157,701

(22) Filed: Jun. 21, 2005

(51) Int. Cl.
*E04C 2/52* (2006.01)
(52) U.S. Cl. .................. 52/220.8; 52/232; 174/481
(58) Field of Classification Search .............. 52/220.8, 52/232; 174/480, 481, 505, 650, 68.1, 72 A, 174/72 C, 152 G, 151, 1, 60, 64
See application file for complete search history.

(56) References Cited

U.S. PATENT DOCUMENTS

| | | | | |
|---|---|---|---|---|
| 4,249,353 A | * | 2/1981 | Berry | 52/232 |
| 4,729,916 A | * | 3/1988 | Feldman | 428/182 |
| 4,919,372 A | * | 4/1990 | Twist et al. | 248/56 |
| 5,067,676 A | * | 11/1991 | Beele | 248/56 |
| 6,530,187 B2 | * | 3/2003 | Shimizu | 52/220.1 |

FOREIGN PATENT DOCUMENTS

JP  402256752 A  * 10/1990

OTHER PUBLICATIONS http://www.thefreedictionary.com/perforated.*
One page brochure of Hilti USA, Schaan, Principality of Liechtenstein, "FS 657 Fire Block", copyright 2001-2005, taken from website http://www.us.hilti.com, printed on Apr. 1, 2005.

* cited by examiner

*Primary Examiner* — Brian Glessner
*Assistant Examiner* — Adriana Figueroa

(57) ABSTRACT

An intumescent structure provides a hermetic-type barrier within a fiber duct through which communications cabling is extended. The structure is formed of a fire-resistant body possessing a plurality of pre-perforated forms that extend through the body. Each of the pre-perforated forms may be sized to have cross-sectional dimensions and geometries that generally correspond to the cross-sectional configurations of communications cabling that are typically placed in a fiber duct to interconnect electronic equipment. Selective removal of the pre-perforated forms establish associated passageways through the body for receiving the appropriately sized cabling therethrough. This facilitates the maintenance of a barrier to gasses and other substances escaping through the duct, while still allowing cabling to freely pass through the duct.

15 Claims, 2 Drawing Sheets

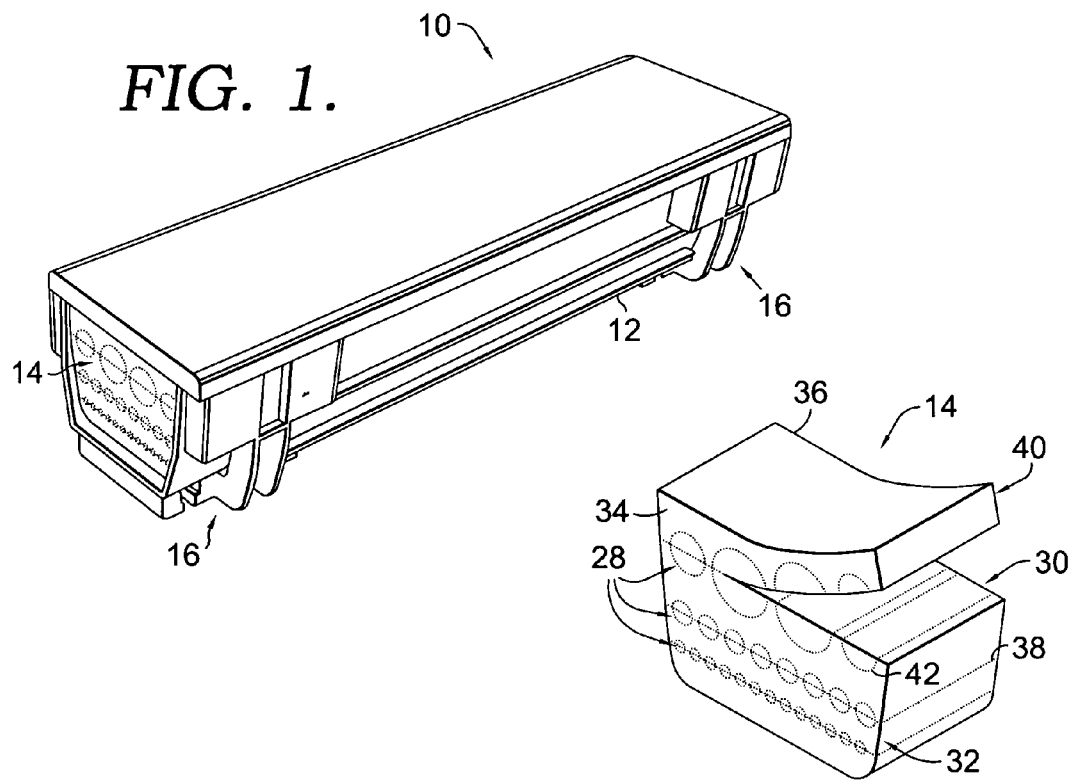
FIG. 1.
FIG. 5.
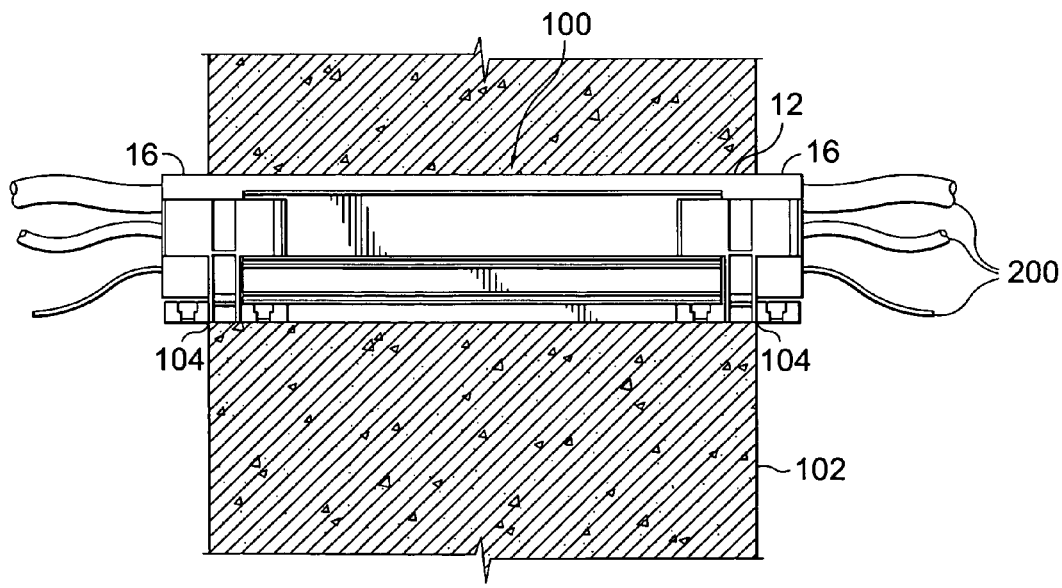
FIG. 2.

INTUMESCENT STRUCTURE FOR DUCTING CARRYING COMMUNICATIONS CABLING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Buildings that house electronic telecommunications equipment may be segmented into a number of rooms. In the case of mobile switching centers (MSCs), or similar facilities, one or more rooms may house various servers, routers, switches, and other telecommunications equipment, and another set of rooms may house computers that control operation of such equipment. Many advantages are provided by maintaining certain electronic equipment in separate rooms, including configuration of the indoor environment (e.g., temperature and humidity) for reliable operation of specific types of equipment, efficiency of operation and ease of interconnectivity of related equipment in close proximity.

Electronic equipment spread across various rooms of an MSC may be interconnected through communications cabling, or fiber, that extends through fiber ducts formed in the walls separating the rooms. These fiber ducts present problems when planning a fire suppression scheme for a multi-room facility. A given facility will typically have a fire suppression system specifically designed to put out the types of fires that are commonly encountered, such as electrical fires. Traditional fire suppression systems utilized where electronic equipment is present accomplish their intended function by either (a) absorbing a large amount of heat energy present in a room to reduce the surface temperature of burning material below it's ignition point, or (b) reducing the oxygen level in a room to a level that is too low for combustion to occur. For instance, fire suppression systems that work on the principle of heat energy absorption may employ various gasses and aerosols, such as potassium compounds suspended in carrier gasses, that are discharged into a particular room when a fire is detected. A similar principal may be applied in systems that reduce room oxygen levels, such as by the discharge of gasses containing a high concentration of carbon dioxide. In either case, the effectiveness of the fire suppression system depends on the ability to maintain the discharged gasses within a room of a given volume until the fire has been eliminated. Unfortunately, fiber ducting provides a path by which the discharged gasses can leave a room, reducing the effectiveness of fire suppression. This is because the cabling does not completely fill the space at the entrance and exit regions of the duct. The fiber ducting may also provide a direct path by which a fire may travel between rooms.

Efforts to fill in the open space around cabling within a duct have led to the use a fire barrier "pillows" or "blocks". These blocks are formed of materials that have a high ignition temperature to resist being consumed by a fire, as well as with intumescent properties so that the blocks expand to fill an open space when exposed to the extreme heat of a fire. Once cabling is extended through a duct, the blocks are placed in the opening of the duct around the cabling.

Fire barrier blocks are effective in blocking the escape of fire suppression system gasses to some degree, but an airtight seal remains difficult within a duct due to imprecision of fitting one or more blocks around cabling and cable trays or within cable-carrying conduits of varying geometries. It is also labor intensive for an installer to cut the blocks on site in order to achieve an improved geometry within the duct for a tighter fit around the cabling.

BRIEF SUMMARY OF THE INVENTION

An intumescent structure provides for increased efficiencies in the creation of a hermetic-type barrier within a fiber duct through which communications cabling is extended. The intumescent structure may have a perimeter geometry specifically selected for an optimal fit within a duct spanning through a wall to connect adjacent rooms or within a cable-carrying conduit. Additionally, intumescent structure installation, in one configuration, may be made before or after cabling has been extended through the duct. These properties of the intumescent structure improve the ability of fire suppression systems to quickly and effectively impede the spread of a fire.

In one aspect, the intumescent structure is formed of a fire-resistant body possessing a plurality of pre-perforated forms that extend through the body. Each of the pre-perforated forms are spaced from one another and may be sized to have cross-sectional dimensions and geometries that generally correspond to the cross-sectional configurations of communications cabling that are typically placed in a fiber duct in connecting electronic equipment. Either before or after the intumescent structure is placed directly in a fiber duct or within a fiber-carrying conduit designed for placement within the duct, the pre-perforated forms may be selectively removed to establish one or more passageways through the body for receiving the appropriately sized cabling therethrough. This facilitates the maintenance of a barrier within the duct that approaches being a complete block to the passage of gasses and other substances, while still allowing cabling to freely pass through the duct.

In another aspect, the pre-perforated forms in the body of the intumescent structure may be aligned with one another in various rows. To provide for installation of the intumescent structure with existing cabling within the duct, pre-perforated divider lines may be formed in the body and arranged to bifurcate the rows of pre-perforated forms and facilitate disassembly of the body into discreet layers. This allows the layers of the intumescent structure to be installed around the cabling without having to remove the cabling from the end connections with electronic equipment.

The apparatus of yet another aspect provides a way for guiding communications cabling through a fiber duct while maintaining a hermetic-type barrier in the duct. Included in the apparatus are a conduit sized to fit within the fiber duct and one or more intumescent fire-resistant blocks disposed generally near one of the opposing opening ends of the conduit. Each intumescent fire-resistant block has a cross-sectional geometry that is generally congruent with the cross-sectional geometry of the opening defined by the respective opening ends of the conduit. Furthermore, a plurality of pre-perforated forms extend through each intumescent fire-resistant block in the longitudinal direction of the conduit, such that selected removal of the forms creates passageways that allow communications cabling to extend through each block and through the fiber duct.

BRIEF DESCRIPTION OF THE SEVERAL VIEWS OF THE DRAWING

In the accompanying drawings which form a part of the specification and are to be read in conjunction therewith and in which like reference numerals are used to indicate like elements in the various views:

FIG. 1 is a perspective view of the intumescent structure positioned within a cable carrying conduit in accordance with one embodiment of the present invention;

FIG. 2 is a sectional view of a wall having a fiber duct extending therethrough with the cable carrying conduit and intumescent structures located in the fiber duct and supporting cabling;

FIG. 5 is a perspective view of the intumescent structure depicting the separation of a discreet layer along one pre-perforated divider line.

DETAILED DESCRIPTION OF THE INVENTION

Figure 3:
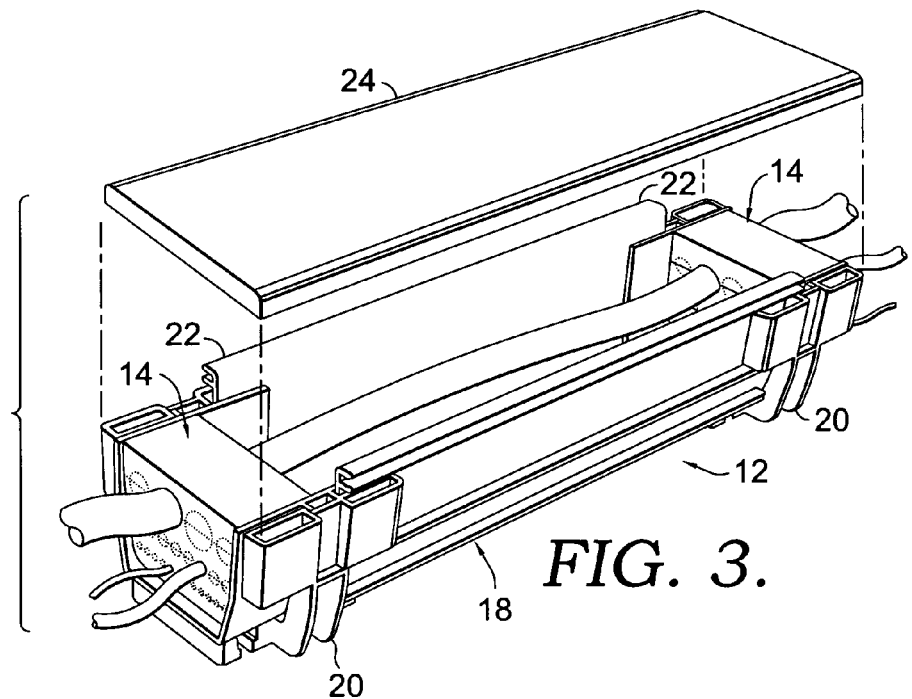
FIG. 3 is an exploded perspective view depicting the removal of the lid of the cable carrying conduit to show the cabling installed through the intumescent structures.

Referring now in more detail to the drawings, and initially to FIG. 1, there is illustrated an embodiment of a communications cabling guiding apparatus of the present invention designated by the reference numeral 10. The apparatus 10 includes a conduit 12 and one or more intumescent fire-resistant structures 14 configured for positioning within the conduit 12. As can be seen with additional reference to FIGS. 2 and 3, the conduit 12 may be sized to fit within a fiber duct 100 extending through a fire-rated or non-fire rated wall 102 dividing adjacent rooms. More specifically, opposed end portions 16 of the conduit 12 may have a perimeter geometry that is the same as the inside surface of the walls of the duct 100, so that the end portions 16 fit tightly within openings 104 of the duct 100. This inhibits the passage of air through the duct 100 around the outside of the conduit 12. Alternatively, various fire-resistant materials, such as those made of the same material as the intumescent structure 14, as will be more fully explained below, may be positioned around the outside of the conduit 12 and within the duct 100 to provide a substantially air tight fit around the conduit 12. Conduit 12 may be formed by a trough 18, and optionally with a coupler 20 attached to one or both opposed ends 22 of the trough 18, as well as a lid 24. Depending on the thickness of the wall 102, multiple troughs 18 and couplers 20 may be connected end-on-end to form the conduit 12, with each trough 18 and pair of couplers 20 having one lid 24. Exemplary conduit 12 structures may include those offered by Telect, Inc. of Liberty Lake, Wash.

Each intumescent structure 14 has a body with a cross-sectional geometry designed to generally mimic the cross-sectional geometry of the portion of the conduit 12 in which the structure 14 is to be located. For instance, a pair of intumescent structures 14 located within openings 26 in the opposed end portions 16 of the conduit 12 (i.e., the space bounded by each coupler 20 and the lid 24) have geometries that generally fill the space of the openings 26, as best seen in FIG. 3. More details about the configuration and usage of the intumescent structure 14 can be understood with additional reference to FIGS. 3-5.

One suitable embodiment provides the intumescent structure 14 as flexible, fire and smoke resistant urethane foam members. This type of material allows for deformation of the structure 14 to fully adapt to the shape of the conduit openings 26, thereby ensuring a fairly tight fit within the conduit 12. Upon receiving heat energy from a fire, the intumescent structure 14 expands within the conduit openings 26 to create a substantially full hermetic barrier to prevent gasses from fire suppression systems from escaping a room through the fiber duct 100 as well as inhibiting the spread of a fire through the duct 100. Examples of products that provide the type of material well suited for forming the intumescent structure 14 include those offered under the name "FS 657 Fire Block" by Hilti Corp. of Tulsa, Okla., and "Fire Barrier Pillow" by 3M Company of St. Paul, Minn.

Figure 4:
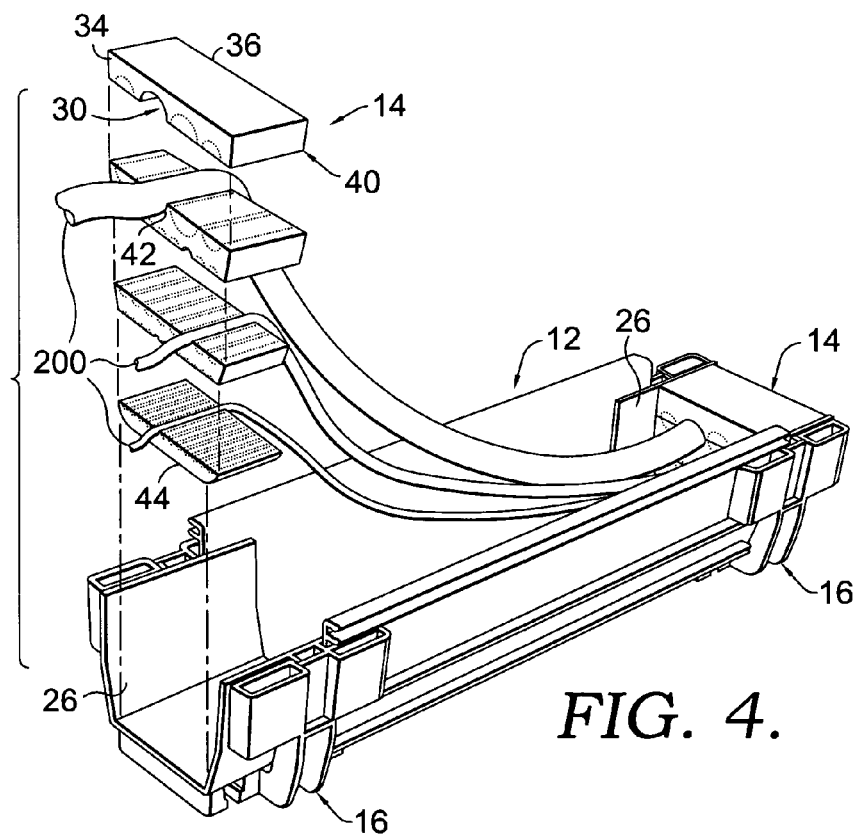
FIG. 4 is a perspective view with the lid of the cable carrying conduit removed to show the discreet layers of the intumescent structure.

The intumescent structure 14 can be seen in detail in FIG. 5, and is provided with a plurality of spaced apart pre-perforated forms 28. The selected removal of specific forms 28 allows for cabling 200 of varying cross-sectional dimensions (e.g., communications or power cables) to be extended through the intumescent structure 14 and the conduit 12 while minimizing any air passageways through the fiber duct 100, as is depicted in FIGS. 2-4. The cross-section of the forms 28 is preferably selected to closely mimic the cross-section of typical communications cabling 200 so that passageways 30 created by removal of the forms 28 are generally the same size as the cabling 200. For instance, the forms 28 may be right circular cylinders or any other profile that cabling 200 may take. Preferably, the forms 28 are arranged in rows 32 and extend through the intumescent structure 14 in parallel fashion from a first side 34 to an opposed second side 36. This alignment positions the forms 28, and therefore the passageways 30, in axial alignment with the longitudinal direction of the conduit 12 through which the cabling 200 extends. Each row 32 may have forms 28 all of the same cross-sectional shape and dimensions, or may have forms 28 of multiple sizes.

One method of creating the forms 28 involves puncturing the intumescent structure 14 completely through from the first side 34 to the second side 36 to create a hole that is fairly narrow in cross-section. Then, in view of the desired geometry of the passageway 30 created by removal of the form 28, the point of puncture is moved a small amount to an adjacent location. If a cylindrical passageway 30 is desired, the puncture point is moved a few degrees around the circumference of the circle outline at the first side 34, and the process is repeated until the given form 28 is fully generated. Enough punctures should be created for a given form 28 so that a reasonable amount of pushing force applied to the form 28 on one of the first side 34 or second side 36 in the axial direction will cause the form 28 to tear away from the body of the structure 14 and leave behind the passageway 30. The cabling 200 corresponding to the particular size of the form 28 removed from each structure 14 may then be slid through the passageways 30 of each structure 14 and through the conduit 12 to reach adjacent rooms, as depicted in FIGS. 2-4. Depending on the access to the fiber duct 10 and within the conduit 12, the cabling 200 may be extended through the passageways 30 before or after the structures 14 are fully installed in the conduit 12. It should also be observed that because of the intumescent nature of the structure 14, the perforation punctures, as well as any small gaps between cabling 200 and the inside walls of the passageways 30 in use, do not provide weak points in the hermetic barrier provided by the structure 14. More specifically, the heat of a fire in a room serviced by the fiber duct 100 causes material expansion of the structures 14, which will substantially closes the punctures and any air gaps.

The arrangement of the rows 32 of forms 28 is also beneficial to the installation of intumescent structures 14 within a conduit 12 where cabling 200 has already been extended through a fiber duct 100 and disconnecting the ends of the cabling 200 for connections with electronic equipment would be laborious or otherwise undesirable. For instance, the cabling 200 may already connect various computers in different rooms such that disconnecting a cable end for extending through one of the passageways 30 of the intumescent structure 14 would result in an interruption of service. Therefore, the rows 32 may each be bifurcated by pre-perforated divider lines 38 so that discreet layers 40 are created when the intumescent structure 14 is pulled apart along the lines 38. Preferably, the rows 32 are horizontally-aligned so that the divider lines 38 form the layers 40 as stacked one above the other, and separation along the divider lines 38 creates vertically-adjacent layers 40 each having a portion of a given form 28, as best seen in FIGS. 4 and 5. Upon selected removal of forms 28, and at least partial division of the structure 14 along respective divider lines 38, cabling 200 can be positioned in a lower portion 42 of a resulting passageway 30 in one layer 40 and an overlying layer 40 aligned with and placed on top of the underlying layer 40. Preferably, the installation process starts with a lowermost layer 44 and continues until the full stack of layers 40 is in place. The weight of overlying layers 40 and supported cabling 200, as well as any compression force provided by lid 24, aid in keeping the divided layers 40 together to minimize air gaps through the structure 14. It should be understood that selected forms 28 may be removed to expose passageways 30 before or after separation of the structure 14 along one or more of the divider lines 38.

One advantage of having each rows 32 of forms 28 with a limited number of sizes is that installation of the intumescent structure 14 can be expedited. An installer can organize the number of cables 200 of a given size together that extend through a given fiber duct 100, and then remove the proper number of forms 28. Thus, a lowermost layer 44 can be put in place within the conduit 12 and the appropriately sized cables 200 (e.g., small diameter cables) positioned in the lower portion 42 of the passageway 30. The next layer 40 is then positioned directly on top of the lowermost layer 44, and the next size of cables 200 are positioned thereon. This process continues until the layers 40 are all stacked together as the complete intumescent structure 14.

Although the apparatus 10 is depicted in the figures as having a pair of intumescent structures 14 disposed at opposed ends 16 of the conduit 12, one or any number of such structures 14 may be utilized in the present invention, and may be positioned at any desired longitudinal point along the conduit 12. It should be also understood that one or more intumescent structures 14 may be utilized within a fiber duct 100 without a conduit 12 that carries cabling 200. In such an arrangement, the intumescent structure 14 should be sized and configured to fit fairly tightly within the fiber duct 100 so that a small amount of dimensional expansion that takes place when the structure 14 receives heat energy creates the desired hermetic barrier within the duct 100.

Therefore, it can be seen that the intumescent structure 14 and apparatus 10 of the present invention provides an effective hermetic barrier within a fiber duct to aid in fire suppression efforts in various types of facilities. Various embodiments of the intumescent structure 14 allow for efficient installation of the hermetic barrier at the time of initial cable installation or when existing cabling is already in place and in use at a facility. Furthermore, it should be understood that various modifications may be made to the embodiments of the present invention described herein without departing from its scope, and that certain features and subcombinations are of utility and may be employed without reference to other features and subcombinations. This is contemplated by and is within the scope of the present invention. It is also to be understood that all matter herein set forth or shown in the accompanying drawings is to be illustrative of applications of the principles of the invention, and not in a limiting sense.

What is claimed is:

1. An apparatus for guiding communications cabling through a duct spanning between adjacent enclosed areas and through which communications cabling is extended, comprising:
   a conduit sized to fit within the duct and having a predetermined internal shape;
   at least one intumescent fire-resistant block having a cross-sectional geometry generally congruent with a cross-sectional geometry of the internal shape of the conduit for positioning therein, said at least one intumescent fire-resistant block having a plurality of pre-perforated forms extending therethrough in the longitudinal direction of said conduit, wherein removal of a selected one of said pre-perforated forms creates a passageway for receiving communications cabling therethrough.

2. The apparatus of claim 1, wherein said conduit has a first end and a second end each defining an opening with a predetermined internal shape, said at least one intumescent fire-resistant block including first and second intumescent fire-resistant blocks, said first block having a cross-sectional geometry generally congruent with a cross-sectional geometry of the opening at the first end of said conduit for positioning therein, said second block having a cross-sectional geometry generally congruent with a cross-sectional geometry of said opening at said second end of said conduit for positioning therein.

3. The apparatus of claim 1, wherein said plurality of pre-perforated forms has a cross-sectional geometric form generally congruent with a cross-sectional geometric form of communications cabling.

4. The apparatus of claim 1, wherein said plurality of pre-perforated forms are cylindrical.

5. The apparatus of claim 1, wherein said plurality of pre-perforated forms are aligned in parallel with one another and arranged in horizontally extending rows.

6. The apparatus of claim 5, further comprising pre-perforated divider lines arranged to bifurcate said horizontally-extending rows of said pre-perforated forms and facilitate disassembly of said at least one intumescent fire-resistant block into discreet layers.

7. The apparatus of claim 5, wherein at least one of said horizontally extending rows includes pre-perforated forms that have the same cross-sectional geometric form and dimensions as other pre-perforated forms within the same horizontally extending row.

8. The apparatus of claim 1, wherein said conduit includes:
   a trough having a first end and a second end;
   a lid removably connected with said trough; and
   at least one coupler, each coupler connected with one of said first end and said second end of said trough.

9. An intumescent structure configured for providing a hermetic barrier within a duct through which communications cabling is extended, the structure comprising:
   a fire-resistant body having a plurality of pre-perforated forms extending therethrough and spaced apart from one another, wherein selected removal of said pre-perforated forms establishes passageways for receiving the communications cabling therethrough.

10. The intumescent structure of claim 9, wherein said plurality of pre-perforated forms have a cross-sectional geometric form generally congruent with a cross-sectional geometric form of said communications cabling.

11. The intumescent structure of claim 9, wherein at least some of said plurality of pre-perforated forms are right circular cylinders.

12. The intumescent structure of claim 9, wherein said plurality of pre-perforated forms include at least a first set and a second set of pre-perforated forms, the cross-sectional size of said first set of pre-perforated forms being greater than the cross-sectional size of said second set of pre-perforated forms.

13. The intumescent structure of claim 9, wherein said plurality of pre-perforated forms are aligned in parallel with one another and arranged in horizontally-extending rows.

14. The intumescent structure of claim 13, wherein said fire-resistant body is formed with pre-perforated divider lines arranged to bifurcate said horizontally-extending rows of said pre-perforated forms and facilitate disassembly of said fire-resistant body into discreet layers.

15. The intumescent structure of claim 13, wherein at least one of said horizontally extending rows includes pre-perforated forms that have the same cross-sectional geometric form and dimensions as the other pre-perforated forms within the same horizontally-extending row.

\* \* \* \* \*